(12) United States Patent
Megahed et al.

(10) Patent No.: US 11,113,756 B2
(45) Date of Patent: Sep. 7, 2021

(54) METHOD FOR MAKING COGNITIVE BIDDING DECISION

(71) Applicant: INTERNATIONAL BUSINESS MACHINES CORPORATION, Armonk, NY (US)

(72) Inventors: Aly Megahed, San Jose, CA (US); Mohamed Mohamed, San Jose, CA (US); Samir Tata, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 186 days.

(21) Appl. No.: 16/140,084

(22) Filed: Sep. 24, 2018

(65) Prior Publication Data

US 2020/0098039 A1   Mar. 26, 2020

(51) Int. Cl.
*G06Q 30/08* (2012.01)
*G06Q 30/02* (2012.01)
*G06N 20/00* (2019.01)

(52) U.S. Cl.
CPC ............ *G06Q 30/08* (2013.01); *G06N 20/00* (2019.01); *G06Q 30/0201* (2013.01)

(58) Field of Classification Search
CPC .... G06Q 30/08; G06Q 30/0601; G06Q 30/06; G06Q 30/0201; G06N 20/00
See application file for complete search history.

(56) References Cited

U.S. PATENT DOCUMENTS

| 7,272,575 | B2 | 9/2007 | Vega |
| 7,672,894 | B2 | 3/2010 | Rebane et al. |
| 8,156,035 | B2 | 4/2012 | Ferguson et al. |
| 2005/0055306 | A1* | 3/2005 | Miller .................. G06Q 10/10 705/37 |
| 2014/0372341 | A1 | 12/2014 | Brown, III |
| 2015/0073929 | A1* | 3/2015 | Psota ................. G06Q 30/0241 705/26.2 |

(Continued)

OTHER PUBLICATIONS

Cagno, E., Caron, F., & Perego, A. (2001). Multi-criteria assessment of the probability of winning in the competitive bidding process. International Journal of Project Management, 19(6), 313-324. (Year: 2001).*

(Continued)

*Primary Examiner* — William S Brockington, III
(74) *Attorney, Agent, or Firm* — Anthony Curro; Otterstedt, Wallace & Kammer, LLP (57) ABSTRACT

A method for a provider to make a cognitive bidding decision may include using a processor and associated memory to a) obtain information, including unstructured data, relating to deals with procuring organizations, and b) determine a respective predicted business growth of each procuring organization based upon the information. The method may also include using the processor and the associated memory to c) determine a respective predicted growth of provider services for each procuring organization based upon the information, and d) determine a respective probability of winning each bid for each deal from each procuring organization. The method may further include using the processor and the associated memory to e) determine a respective predicted revenue based upon winning each bid, and determine whether to submit each bid based upon b), c), d), and e).

19 Claims, 3 Drawing Sheets

(56) References Cited

U.S. PATENT DOCUMENTS

2019/0130476 A1* 5/2019 Zhu .................. G06N 5/02

OTHER PUBLICATIONS

Megahed et al, "Top-Down Pricing of IT Services Deals with Recommendation for Missing Values of Historical and Market Data"; Proceedings of the International Conference on Service-Oriented Computing (ICSOC); 2016; pp. 745-760.
Greenia et al.; "A win prediction model for IT outsourcing bids"; Service Research and Innovation Institute Global Conference; 2014; pp. 39-42.
Nezhad et al.;"Health identification and outcome prediction for outsourcing services based on textual comments"; IEEE SCC, 2014, pp. 155-162.
Megahed et al.; "Modeling business insights into predictive analytics for the outcome of IT service contracts"; Proc. IEEE International Conference on Service Computing, 2015, pp. 515-521.
Tsai et al., "DICB: Dynamic Intelligent Customizable Benign Pricing Strategy for Cloud Computing"; 2012 IEEE 5th International Conference on Cloud Computing (CLOUD); 2012; pp. 654-661.

* cited by examiner

METHOD FOR MAKING COGNITIVE BIDDING DECISION

BACKGROUND

The present invention relates to cognitive decision making, and more specifically, to cognitively determining whether to submit a bid. Service providers typically bid on deals to deliver services to clients. In order to pursue such bids, providers may use some resources (e.g., a salesforce) that are typically capacitated. Thus, providers may be desirous of determining, at a given time, which deals out of the potential ones, they should bid on.

Several factors may be considered when making a decision to bid on a deal. For example, one factor may be the expected revenue for a service provider and may be considered as part of the decision to bid on a deal. Still, further factors may be desirable to provide a more accurate bidding decision.

SUMMARY

A method for a provider to make a cognitive bidding decision may include using a processor and associated memory to a) obtain information, including unstructured data, relating to a plurality of deals with a plurality of procuring organizations, and b) determine a respective predicted business growth of each procuring organization based upon the information. The method may also include using the processor and associated memory to c) determine a respective predicted growth of provider services for each procuring organization based upon the information, and d) determine a respective probability of winning each bid for each deal from each procuring organization. The method may further include using the processor and associated memory to e) determine a respective predicted revenue based upon winning each bid, and f) determine whether to submit each bid based upon b), c), d), and e).

The method may further include using the processor and associated memory to further determine whether to submit each bid based upon available provider resources. The processor and associated memory may be used to determine whether to submit each bid based upon a highest predicted revenue, for example.

The processor and associated memory may be used to determine the respective predicted revenues based upon b), c), d) and a respective deal revenue for each deal. Using the processor and associated memory to generate the respective predicted business growth of each procuring organization may include using feature vector build up and model training, for example.

Using the processor and associated memory to generate the respective predicted growth of provider services to each procuring organization may include using feature vector build up and model training. Using the processor and associated memory to determine the respective probability of wining each bid may include using a machine learning classification model. The processor and associated memory may be used to obtain information further including structured data.

The unstructured data may include at least one of news data, expert rating data, growth expectation data, provider-client communications, requests for proposal, and procuring organization website information. The information may include historical deal data and procuring organization metadata, for example.

The information may include structured data, and one of the respective predicted business growth and respective predicted growth of provider services may be determined based upon a first prediction model based upon the structured data, a second prediction model based upon the unstructured data, and a combined model configured to provide a final output based upon at least one of an aggregation of an output of each of the first and second prediction models and a building of a model based upon the output of each of the first and second prediction models. The information may include structured data, and one of the respective predicted business growth and respective predicted growth of provider services is determined based upon structuring of the unstructured data to generate newly structured data and generation of a trained prediction model based upon the structured data and the newly structured data.

A system aspect is directed to a system for a provider to make a cognitive bidding decision that may include a processor and associated memory configured to a) obtain information, including unstructured data, relating to a plurality of deals with a plurality of procuring organizations, and b) determine a respective predicted business growth of each procuring organization based upon the information. The processor and associated memory may be configured to c) determine a respective predicted growth of provider services for each procuring organization based upon the information, and d) determine a respective probability of winning each bid for each deal from each procuring organization. The processor and associated memory may be configured to e) determine a respective predicted revenue based upon winning each bid, and f) determine whether to submit each bid based upon b), c), d), and e).

A computer readable medium aspect is directed to a computer readable medium for a provider to make a cognitive bidding decision. The computer readable medium may include computer executable instructions that when executed by a processor cause the processor to perform operations. The operations may include a) obtaining information, including unstructured data, relating to a plurality of deals with a plurality of procuring organizations and b) determining a respective predicted business growth of each procuring organization based upon the information. The operations may also include c) determining a respective predicted growth of provider services for each procuring organization based upon the information and d) determining a respective probability of winning each bid for each deal from each procuring organization. The operations may also include e) determining a respective predicted revenue based upon winning each bid, and f) determining whether to submit each bid based upon b), c), d), and e).

DETAILED DESCRIPTION

Figure 1:
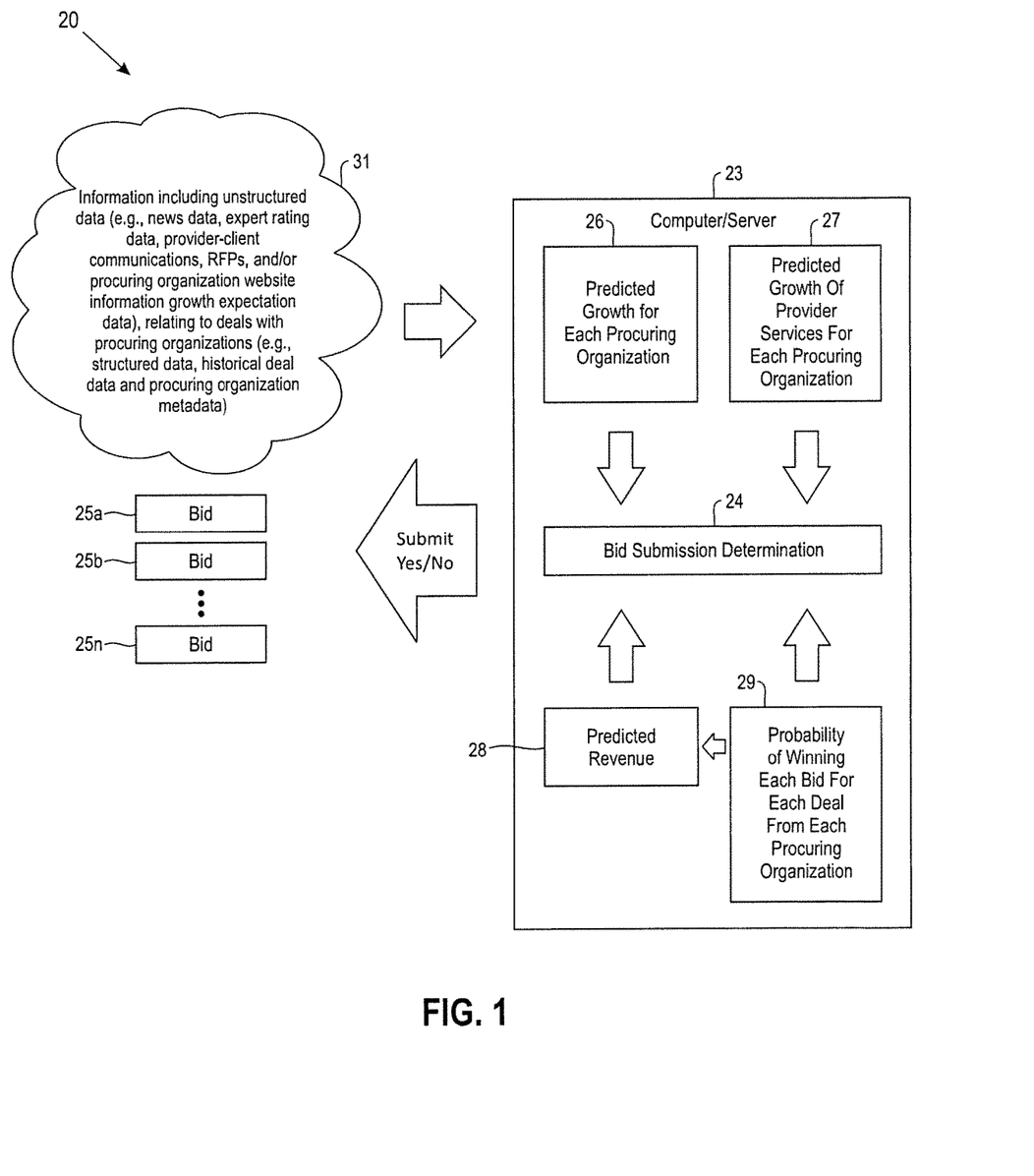
FIG. 1 is a schematic diagram of a system for a provider to make a cognitive bidding decision in accordance with an embodiment.
Figure 2:
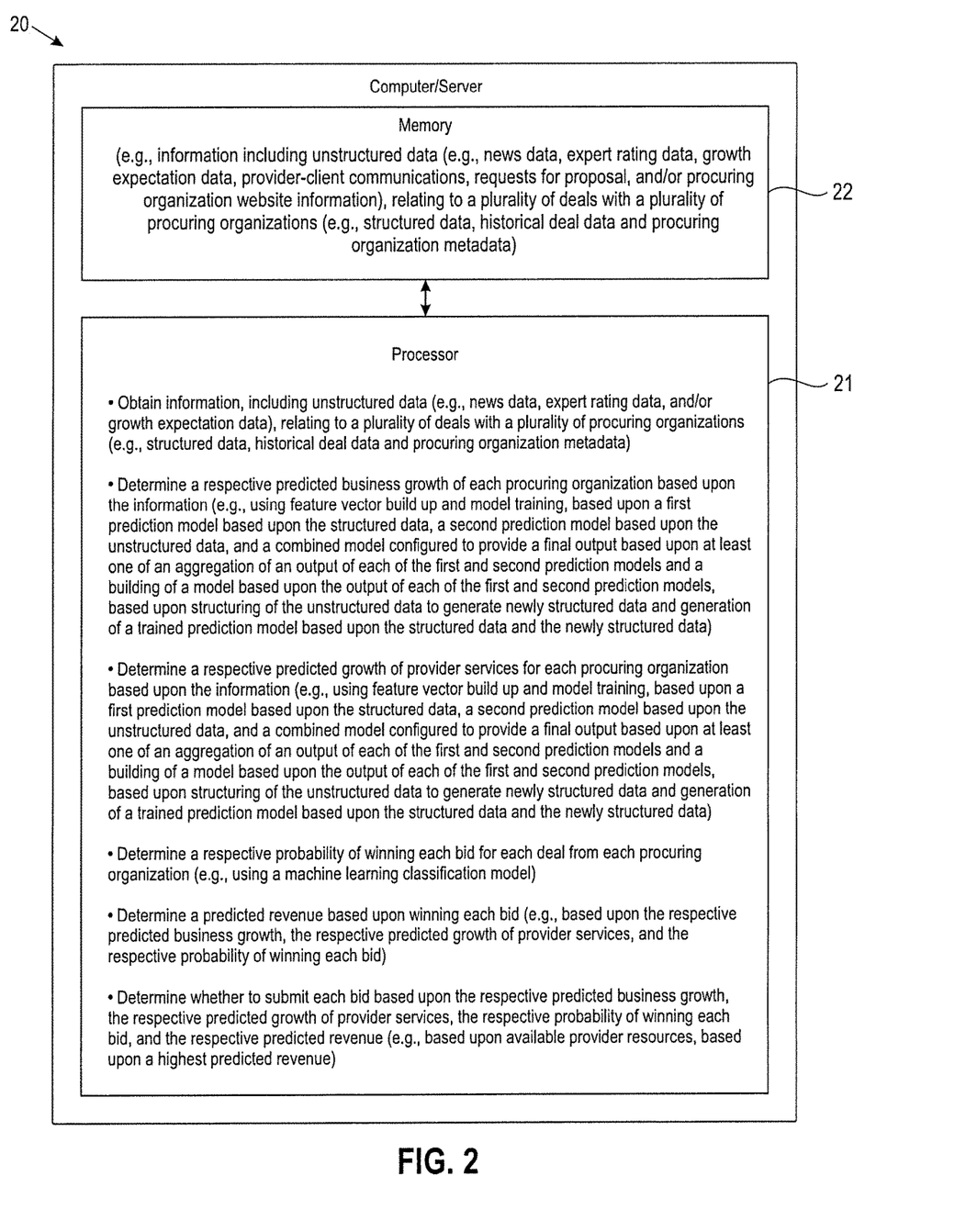
FIG. 2 is a schematic block diagram of the system of FIG. 1.

Referring initially to FIGS. 1 and 2, a system for a provider to make a cognitive bidding decision 20 includes a processor 21 and associated memory 22. The processor 21 and the associated memory 22 may be part a server/computer 23, for example. More than one server/computer 23 may be used, and the one or more server/computers may be physically separate, shared, and/or be cloud based. While operations of the processor 21 will be described herein, it should be understood that the operations described involve cooperation between the processor and the associated memory 22.

Figure 3:
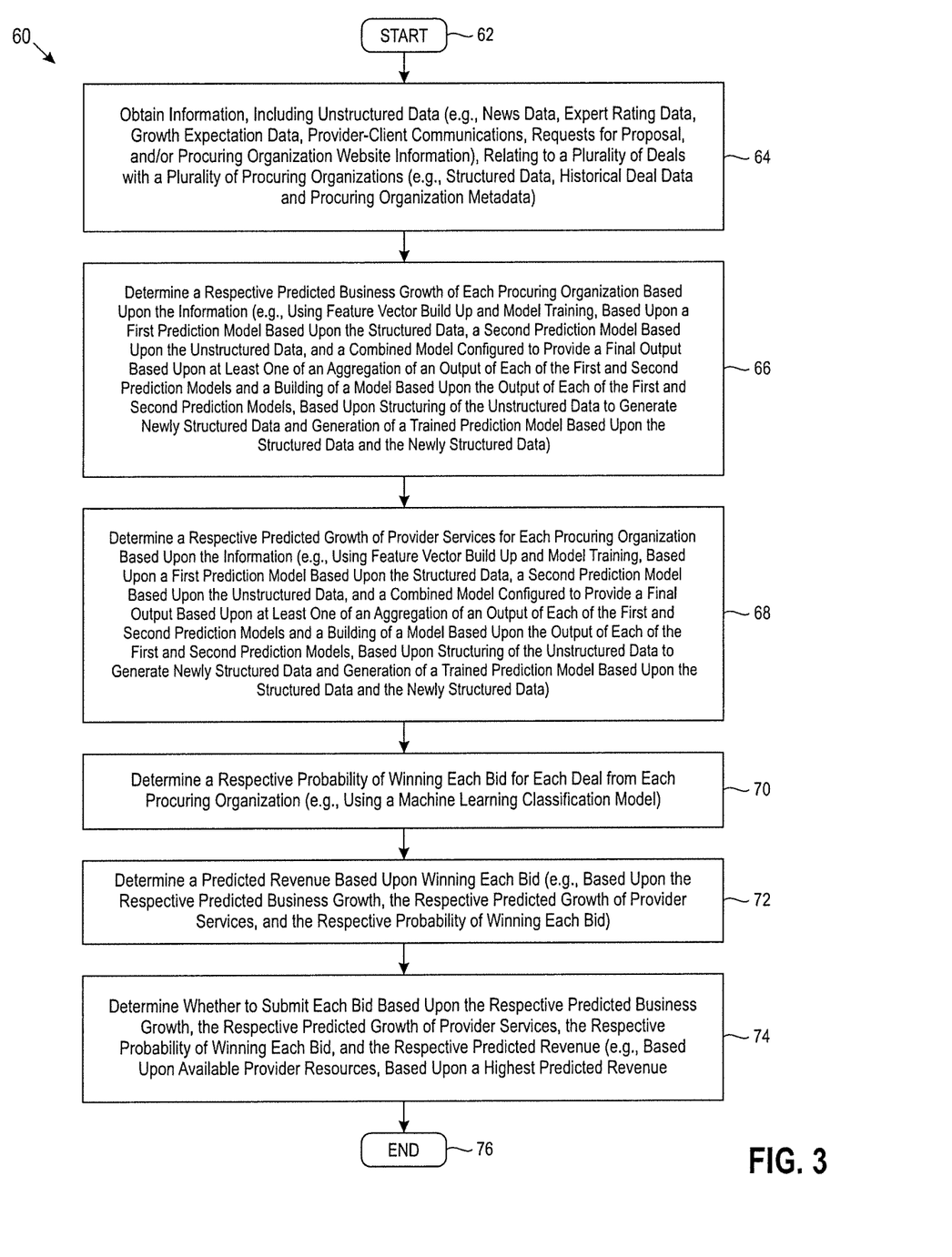
FIG. 3 is a flow diagram illustrating operations for a provider to make a cognitive bidding decision in accordance with an embodiment.

Referring additionally to the flowchart 60 in FIG. 3, beginning at Block 62, operations of the processor 21 and associated memory 22 for a provider to make a cognitive bidding decision will now be described. At Block 64, information 31 is obtained, including unstructured data relating to deals with procuring organizations. The unstructured data may include any one or more of news data, expert rating data, growth expectation data, provider-client communications, requests for proposal, and procuring organization website information. Of course, the unstructured data may include other and/or additional type of data. The information 31 is stored in the memory 22. The information 31 obtained, and stored in the memory 22 may also include structured data and procuring organization metadata.

A Block 66, the operations include determining a respective predicted business growth of each procuring organization 26 based upon the information 31. More particularly, the respective predicted business growth of each procuring organization 26 may be generated using a feature vector build up and model training.

At Block 68, a respective predicted growth of provider services for each procuring organization 27 based upon the information 31 is determined. The respective predicted growth of provider services to each procuring organization 27 may be generated using feature build up and model training.

More particularly, one or both of the of the respective predicted business growth and respective predicted growth of provider services may be determined based upon a first prediction model based upon the structured data, a second prediction model based upon the unstructured data, and a combined model configured to provide a final output based upon at least one of an aggregation of an output of each of the first and second prediction models and a building of a model based upon the output of each of the first and second prediction models. In some embodiments, the either or both of the respective predicted business growth and respective predicted growth of provider services may be determined based upon structuring of the unstructured data to generate newly structured data and generation of a trained prediction model based upon the structured data and the newly structured data, for example.

A respective probability of winning each bid for each deal from each procuring organization 29 is determined at Block 70. The determination 24 of the respective probability of winning each bid 29 may be determined based upon a machine learning classification model.

At Block 72, a respective predicted revenue 28 is determined based upon winning each bid. The respective predicted revenue 28 may be determined based upon the determined respective predicted business growth 26 (Block 66), the respective predicted growth of provider services 27 (Block 68), the respective determined probability of winning each bid (Block 70), and a respective deal revenue for each deal.

A determination 24 is made at Block 74 as to whether to submit each bid 25a-25n based upon the determined respective predicted business growth 26 (Block 68), the respective predicted growth of provider services 27 (Block 68), the respective determined probability of winning 29 each bid 25a-25n (Block 70), and the determined respective predicted revenue 28 (Block 72).

The bid submission determination 24 may be based upon available provider resources, for example. The bid submission determination 24 may alternatively or additionally be based upon a highest predicted revenue. Operations end at Block 76.

Further details of the operations for a provider to make a cognitive bidding decision will now be described. With respect to the client or business growth prediction 26, unstructured provider-client data (e.g., emails, requests for proposals (RFPs), responses to RFPs, etc.) as well as client meta-data are analyzed to predict the growth potential for the provider-client business. That growth potential may be one of multiple levels of growth (e.g., level 1 corresponds to growth of less than 5%, level 2 corresponds to 5% to 25% growth, etc.). The prediction of the model is a percentage for each of the possible types. For example, the prediction is given such that there is a 90% chance that provider-client x business would have a growth potential corresponding to level 1, a 5% chance it would correspond to level 2, and 5% chance it would correspond to level 3.

Training, to determine the predicted business growth or client growth includes a feature vector built up and model training. With respect to predicting, a trained model is used to perform the prediction.

With respect to the predicted growth of provider services or provider-client business growth 27, the operations are similar to those described above with respect to the client growth prediction. Unstructured provider-client data (e.g., emails, RFPs, responses to RFPs, etc.) is analyzed as well as client meta-data to predict the growth potential for the provider-client business. That growth potential is, similar to above, assigned to one multiple levels of growth (e.g., level 1 corresponds to growth of less than 5%, level 2 corresponds to 5% to 25% growth, etc.).

The prediction of the model is a percentage for each of the possible types. For example, the prediction is given such that there is a 90% chance that provider-client x business would have a growth potential corresponding to level 1, a 5% chance it would correspond to level 2, and 5% chance it would correspond to level 3.

Training, to determine the predicted growth of provider services or provider-client business growth includes a feature vector built up and model training. With respect to predicting, a trained model is used to perform the prediction.

Still further, with respect to predicting provider-client business growth, trained model or determination of the predicted growth may be based upon structured data, which, as will be appreciated by those skilled in the art, naturally forms a feature vector. The unstructured data, as described above, that is analyzed may include any one or more of a bag-of-word feature vector, any topic modeling feature vector (e.g., probabilistic latent semantic analysis, latent Dirichlet allocation), and any word-embedding techniques (e.g., Word2Vec).

In an embodiments, a single model may be used. For example, a feature vector from the structured and unstructured data may be concatenated into one single vector. Any available classifier (e.g., logistic regression, support vector machine, decision tree, etc.) may then be trained, for example, based upon the concatenated single vector.

In another embodiment, which may be considered a hybrid model, any available classifier may be trained on a feature vector of the structured data, and any available classifier may be trained on a feature vector of the unstructured data. The two models or classifiers are then combined using combination techniques that will be appreciated by those skilled in the art, (e.g., average, linear combination/weighted sum, non-linear combination).

With respect to determining whether to bid on the deal or to submit each bid 25a-25n, if the deal is predicted to be lost, then decision is do not bid. For deals predicted to be won 29, the choice may thus then be to bid on deals that have the highest predicted revenue. For those deals predicted to be won, the list of predicted winning deals is traversed and the resources, for example, required of the chosen deals, are summed up until a capacity threshold is met.

The predicted revenue 28 may be calculated as a function aggregating the growth potential of the client, the growth potential of the provider-client business, the chance of winning, and the deal's revenue. Such function can be any user-input function, any relatively simple function as multiplication, or any more complex aggregation/ensemble function.

Those skilled in the art will appreciate that consideration of many factors may be desirable when making a bidding decision. The system 20 described herein considers factors, such as, for example, the expected revenue of these deals, the chances of winning the deals, and the potential growth of business with the client (for example, if there are two bids and only one of them can be pursued, and where both bids have the same chance of winning, but the first one has a little higher revenue than the second one, the second one may still be chosen if the potential business growth for the client of the second one is high enough to make it more profitable on the longer run). Current approaches to determining whether to submit a bid typically consider only the expected revenue of deals, but do not consider all of the expected revenue of the deals, the chances of winning the deals, and the potential growth of business with the client, for example, simultaneously.

A system aspect is directed to a system for a provider to make a cognitive bidding decision 20 that includes a processor 21 and associated memory 22 configured to a) obtain information 31, including unstructured data, relating to a plurality of deals with a plurality of procuring organizations, and b) determine a respective predicted business growth of each procuring organization 26 based upon the information. The processor 21 and associated memory 22 are configured to c) determine a respective predicted growth of provider services 27 for each procuring organization based upon the information 31, and d) determine a respective probability of winning each bid 25a-25n for each deal from each procuring organization. The processor 21 and associated memory 22 are configured to e) determine a respective predicted revenue 28 based upon winning each bid 25a-25n, and f) determine whether to submit each bid based upon b), c), d), and e).

A computer readable medium aspect is directed to a computer readable medium for a provider to make a cognitive bidding decision. The computer readable medium includes computer executable instructions that when executed by a processor 21 cause the processor to perform operations. The operations include a) obtaining information 31, including unstructured data, relating to a plurality of deals with a plurality of procuring organizations and b) determining a respective predicted business growth of each procuring organization 26 based upon the information. The operations also include c) determining a respective predicted growth of provider services for each procuring organization 27 based upon the information 31 and d) determining a respective probability of winning each bid for each deal from each procuring organization 29. The operations also include e) determining a respective predicted revenue 28 based upon winning each bid 25a-25n, and f) determining whether to submit each bid based upon b), c), d), and e).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a provider to make a cognitive bidding decision comprising:
    using a processor and associated memory to
    obtain information, including unstructured data and structured data, relating to a plurality of deals with a plurality of procuring organizations;
    train a first machine learning prediction model based upon the structured data;
    train a second machine learning prediction model based upon the unstructured data;
    train a combined machine learning model, the combined machine learning model configured to provide a final output based upon at least one of an aggregation of an output of each of the first and second machine learning prediction models and a building of a model based upon the output of each of the first and second machine learning prediction models;
    determine a respective predicted business growth of each procuring organization based upon the information;
    determine a respective predicted growth of provider services for each procuring organization based upon the information;
    determine a respective probability of winning each bid for each deal from each procuring organization;
    determine a respective predicted revenue based upon winning each bid; and
    determine whether to submit each bid based upon the respective predicted business growth of each procuring organization, the respective predicted growth of provider services for each procuring organization, the respective probability of winning each bid for each deal from each procuring organization, and the respective predicted revenue;
    wherein one of the respective predicted business growth and the respective predicted growth of provider services is determined based upon the first machine learning prediction model based upon the structured data, the second machine learning prediction model based upon the unstructured data, and the combined machine learning model; and
    wherein each respective predicted business growth is one of multiple levels of growth and wherein the first machine learning prediction model generates a prediction percentage for each of the multiple levels of growth.

2. The method of claim 1 comprising using the processor and associated memory to further determine whether to submit each bid based upon available provider resources.

3. The method of claim 1 wherein using the processor and associated memory to determine whether to submit each bid is based upon a highest predicted revenue.

4. The method of claim 1 wherein using the processor and associated memory to determine the respective predicted revenue is based upon the respective predicted business growth of each procuring organization, the respective predicted growth of provider services for each procuring organization, the respective probability of winning each bid for each deal from each procuring organization, and a respective deal revenue for each deal.

5. The method of claim 1 wherein using the processor and associated memory to determine the respective predicted business growth of each procuring organization comprises using feature vector build up and model training.

6. The method of claim 1 wherein using the processor and associated memory to determine the respective predicted growth of provider services for each procuring organization comprises using feature vector build up and model training.

7. The method of claim 1 comprising using the processor and associated memory to determine the respective probability of winning each bid comprises using a machine learning classification model.

8. The method of claim 1 wherein the unstructured data comprises at least one of news data, expert rating data, growth expectation data, provider-client communications, requests for proposal, and procuring organization website information.

9. The method of claim 1 wherein the information comprises historical deal data and procuring organization metadata.

10. The method of claim 1 wherein one of the respective predicted business growth and the respective predicted growth of provider services is determined based upon structuring of the unstructured data to generate newly structured data and generation of a trained prediction model based upon the structured data and the newly structured data.

11. A system for a provider to make a cognitive bidding decision comprising:
a processor and associated memory configured to
obtain information, including unstructured data, relating to a plurality of deals with a plurality of procuring organizations;
train a first machine learning prediction model based upon the structured data;
train a second machine learning prediction model based upon the unstructured data;
train a combined machine learning model, the combined machine learning model configured to provide a final output based upon at least one of an aggregation of an output of each of the first and second machine learning prediction models and a building of a model based upon the output of each of the first and second machine learning prediction models;
determine a respective predicted business growth of each procuring organization based upon the information;
determine a respective predicted growth of provider services for each procuring organization based upon the information;
determine a respective probability of winning each bid for each deal from each procuring organization;
determine a respective predicted revenue based upon winning each bid; and
determine whether to submit each bid based upon the respective predicted business growth of each procuring organization, the respective predicted growth of provider services for each procuring organization, the respective probability of winning each bid for each deal from each procuring organization, and the respective predicted revenue;
wherein one of the respective predicted business growth and the respective predicted growth of provider services is determined based upon the first machine learning prediction model based upon the structured data, the second machine learning prediction model based upon the unstructured data, and the combined machine learning model; and
wherein each respective predicted business growth is one of multiple levels of growth and wherein the first machine learning prediction model generates a prediction percentage for each of the multiple levels of growth.

12. The system of claim 11 wherein the processor and associated memory are configured to determine whether to submit each bid based upon available provider resources.

13. The system of claim 11 wherein the processor and associated memory are configured to determine whether to submit each bid based upon a highest predicted revenue.

14. The system of claim 11 wherein the processor and associated memory are configured to determine the respective predicted revenue based upon the respective predicted business growth of each procuring organization, the respective predicted growth of provider services for each procuring organization, the respective probability of winning each bid for each deal from each procuring organization and a respective deal revenue for each deal.

15. The system of claim 11 wherein the processor and associated memory are configured to determine the respective predicted business growth of each procuring organization using feature vector build up and model training.

16. A non-transitory computer readable medium for a provider to make a cognitive bidding decision, the computer readable medium comprising computer executable instructions which when executed by a processor cause the processor to perform operations comprising:
obtaining information, including unstructured data, relating to a plurality of deals with a plurality of procuring organizations;
training a first machine learning prediction model based upon the structured data
training a second machine learning prediction model based upon the unstructured data;
training a combined machine learning model, the combined machine learning model configured to provide a final output based upon at least one of an aggregation of an output of each of the first and second machine learning prediction models and a building of a model based upon the output of each of the first and second machine learning prediction models;
determining a respective predicted business growth of each procuring organization based upon the information;
determining a respective predicted growth of provider services for each procuring organization based upon the information;
determining a respective probability of winning each bid for each deal from each procuring organization;
determining a respective predicted revenue based upon winning each bid; and
determining whether to submit each bid based upon the respective predicted business growth of each procuring organization, the respective predicted growth of provider services for each procuring organization, the respective probability of winning each bid for each deal from each procuring organization, and the respective predicted revenue;
wherein one of the respective predicted business growth and the respective predicted growth of provider services is determined based upon the first machine learning prediction model based upon the structured data, the second machine learning prediction model based upon the unstructured data, and the combined machine learning model; and wherein each respective predicted business growth is one of multiple levels of growth and wherein the first machine learning prediction model generates a prediction percentage for each of the multiple levels of growth.

17. The computer readable medium of claim 16 wherein the operations comprise determining whether to submit each bid based upon available provider resources.

18. The computer readable medium of claim 16 wherein the operations comprise determining whether to submit each bid based upon a highest predicted revenue; and wherein the operations comprise determining the respective predicted revenue based upon the respective predicted business growth of each procuring organization, the respective predicted growth of provider services for each procuring organization, the respective probability of winning each bid for each deal from each procuring organization and a respective deal revenue for each deal.

19. The method of claim 1, wherein the unstructured data includes a topic modeling feature vector based on probabilistic latent semantic analysis or latent Dirichlet allocation.

* * * * *